United States Patent
Lu et al.

(10) Patent No.: US 11,354,827 B2
(45) Date of Patent: Jun. 7, 2022

(54) METHODS AND SYSTEMS FOR FUSION DISPLAY OF THERMAL INFRARED AND VISIBLE IMAGE

(71) Applicant: ZHEJIANG DAHUA TECHNOLOGY CO., LTD., Zhejiang (CN)

(72) Inventors: Wei Lu, Hangzhou (CN); Qiankun Li, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 60 days.

(21) Appl. No.: 16/908,667

(22) Filed: Jun. 22, 2020

(65) Prior Publication Data

US 2020/0357147 A1 Nov. 12, 2020

Related U.S. Application Data

(63) Continuation of application No. 15/766,828, filed as application No. PCT/CN2016/100357 on Sep. 27, 2016, now Pat. No. 10,719,958.

(30) Foreign Application Priority Data

Oct. 9, 2015 (CN) .......................... 201510648274.6

(51) Int. Cl.
*G06T 5/50* (2006.01)
*H04N 5/33* (2006.01)
(Continued)

(52) U.S. Cl.
CPC .............. *G06T 11/001* (2013.01); *G06T 5/50* (2013.01); *H04N 5/33* (2013.01); *H04N 5/332* (2013.01);
(Continued)

(58) Field of Classification Search
None
See application file for complete search history.

(56) References Cited

U.S. PATENT DOCUMENTS 7,620,265 B1 11/2009 Wolff et al.
8,755,597 B1 6/2014 Tantalo et al.
(Continued)

FOREIGN PATENT DOCUMENTS

CN 102547063 A 7/2012
CN 102722864 A 10/2012
(Continued)

OTHER PUBLICATIONS

International Search Report in PCT/CN2016/100357 dated Dec. 21, 2016, 3 pages.
(Continued)

*Primary Examiner* — Bernard Krasnic
(74) *Attorney, Agent, or Firm* — Metis IP LLC

(57) ABSTRACT

A method relating to an image fusion includes acquiring a thermal infrared image and a visible image. The method also includes receiving a fusion parameter corresponding to a color space and generating, based on the fusion parameter, a fused image of the thermal infrared image and the visible image. The method further includes receiving a regulation parameter, the regulation parameter including a color scheme or a partial contrast, and adjusting the fused image according to the regulation parameter.

20 Claims, 9 Drawing Sheets

(51) Int. Cl.
*G06T 11/00* (2006.01)
*H04N 9/64* (2006.01)
(52) U.S. Cl.
CPC ..... *H04N 9/64* (2013.01); *G06T 2207/10016* (2013.01); *G06T 2207/10024* (2013.01); *G06T 2207/10048* (2013.01); *G06T 2207/20221* (2013.01)

(56) References Cited

U.S. PATENT DOCUMENTS

| | | | |
|---|---|---|---|
| 8,824,828 B1* | 9/2014 | Winn | H04N 5/367 |
| | | | 382/274 |
| 10,719,958 B2* | 7/2020 | Lu | G06T 5/50 |
| 2010/0127171 A1 | 5/2010 | Jonsson et al. | |
| 2012/0262584 A1 | 10/2012 | Strandemar | |
| 2014/0218538 A1 | 8/2014 | Choi | |
| 2014/0346359 A1* | 11/2014 | Holliday | H04N 13/239 |
| | | | 250/340 |
| 2015/0334315 A1* | 11/2015 | Teich | G06T 5/20 |
| | | | 348/164 |
| 2018/0300906 A1 | 10/2018 | Lu et al. | |

FOREIGN PATENT DOCUMENTS

| | | |
|---|---|---|
| CN | 104079908 A | 10/2014 |
| CN | 104240246 A | 12/2014 |
| EP | 2921995 A1 | 9/2015 |
| WO | 0182593 A1 | 11/2001 |
| WO | 2013144298 A1 | 10/2013 |

OTHER PUBLICATIONS

Written Opinion in PCT/CN2016/100357 dated Dec. 21, 2016, 4 pages.
First Office Action in Chinese Application No. 201510646274.6 dated Nov. 6, 2017, 13 pages.
Extended European Search Report in European Application No. 16853079.8 dated Aug. 2, 2018, 10 pages.
Zeng, Xiangtong et al., One color contrast enhanced infrared and visible image fusion method, Infrared and Laser Engineering, 44(4):1198-1202, 2015.
Yin, Songfeng et al., One color contrast enhanced infrared and visible image fusion method, Infrared Physics & Technology, 53(2): 146-150, 2010.
Xue, Zhiyun et al., Concealed Weapon Detection Using Color Image Fusion, ISIF, 622-627, 2003.
Schmidt, R., Benefits of IR/Visible Fusion, Proceedings of SPIE, 2007, 6 pages.
Communication pursuant to Article 94(3) EPC in European Application No. 16853079.8 dated Feb. 3, 2021, 6 pages.

* cited by examiner

METHODS AND SYSTEMS FOR FUSION DISPLAY OF THERMAL INFRARED AND VISIBLE IMAGE

CROSS-REFERENCE TO RELATED APPLICATIONS

This application is a continuation of U.S. application Ser. No. 15/766,828, filed on Apr. 8, 2018, which is a U.S. national stage application of International Application No. PCT/CN2016/100357, filed on Sep. 27, 2016, designating the United States of America, which in turn claims priority of Chinese Patent Application No. 201510648274.6, filed on Oct. 9, 2015, the disclosure of each of which is expressly incorporated herein by reference to its entirety.

TECHNICAL FIELD

This present disclosure generally relates to image fusion, and more particularly, relates to methods and systems for image fusion of thermal infrared and visible images.

BACKGROUND

Thermal imaging devices can be used to obtain temperature information of a target scene. The obtained temperature information may then be quantized and normalized to some discrete values range from 0 to 255 (i.e., [0, 255]). A grayscale image may then be generated according to the discrete values. In order to show distribution characteristics of temperature of the target scene, a color image may be obtained based on a temperature quantized value-hue lookup table. However, the color image may lack of edge and/or other details due to its low resolution.

Visible imaging devices can be used to capture visible light information of a target scene. Generally, a visible image may have higher resolution compared with the grayscale image generated by a thermal imaging device. If different information in the thermal infrared image and the visible image can be combined together, and displayed in a fused image, it may make full use of advantages of both thermal imaging device and visible imaging device. By this way, for a user, distribution characteristics of temperature and detailed information of the target scene may be acquired at the same time in a single fused image. Although there were plenty of disclosures focusing on image registration, that may determine an overlapping area between a thermal infrared image and a visible image, disclosures such as how to merge images' information in an appropriate way, or how to display the fused image in a personalized way are still in need.

SUMMARY

An aspect of the present disclosure relates to an image fusion method. The method may include one or more of the following operations. A thermal infrared image and a visible image may be acquired. A fusion parameter corresponding to a color space may be received. A fused image of the thermal infrared image and the visible image may be generated based on the fusion parameter. A regulation parameter including a color scheme or a partial contrast may be obtained. The fused image may be adjusted according to the regulation parameter.

In some embodiments, the color space may comprise an HSI space, a CIE space, or an RGB space.

In some embodiments, the color space may be an HSI space. The fusion parameter corresponding to the color space may include a hue value, a saturation value, and an intensity value.

In some embodiments, the fusion parameter corresponding to the color space may include a hue value. The hue value may be determined according to the thermal infrared image.

In some embodiments, the fusion parameter corresponding to the color space may include a saturation value. The saturation value may be determined accordingly to the thermal infrared image and the visible image.

In some embodiments, the fusion parameter corresponding to the color space may include an intensity value. The intensity value may be determined based on the visible image.

In some embodiments, the color scheme may include a black-and-white decoration.

In some embodiments, the regulation parameter may include a color scheme. The fused image adjusting according to the regulation parameter may include a color display of the fused image adjusting according to the color scheme.

In some embodiments, the method may further comprise selecting a region of interest (ROI) in the fused image. The ROI may be magnified. The regulation parameter may include a partial contrast. The fused image adjusting according to the regulation parameter may include the contrast level of the ROI adjusting.

In some embodiments, the method may further comprise detecting or tracking an object according to the adjusted fused image.

In another aspect of the present disclosure, a system is provided. In some embodiments, the system may comprise an imaging device configured to acquiring a thermal infrared image and a visible image. One or more processor may be configured to execute instructions. A fusion parameter corresponding to a color space may be received. A fused image of the thermal infrared image and the visible image may be generated based on the fusion parameter. A regulation parameter including a color scheme or a partial contrast may be obtained. The fused image according to the regulation parameter may be adjusted.

Yet another aspect of the present disclosure is directed to a non-transitory computer readable medium embodying a computer program product, the computer program product comprising instructions configured to cause a computing device to acquire a thermal infrared image and a visible image. The computer program product also includes instructions configured to cause the computing device to receive a fusion parameter corresponding to a color space and generate, based on the fusion parameter, a fused image of the thermal infrared image and the visible image. The computer program product further includes instructions configured to cause the computing device to receive a regulation parameter, the regulation parameter including a color scheme or a partial contrast, and adjust the fused image according to the regulation parameter.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of example in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "module" and/or "unit" used herein are one method to distinguish different components, elements, parts, section or assembly of different level in ascending order. However, the terms may be displaced by other expression if they may achieve the same purpose.

It will be understood that when a device, unit, or module is referred to as being "on," "connected to," or "coupled to" another device, unit, or module, it may be directly on, connected or coupled to, or communicate with the other device, unit, or module, or an intervening device, unit, or module may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
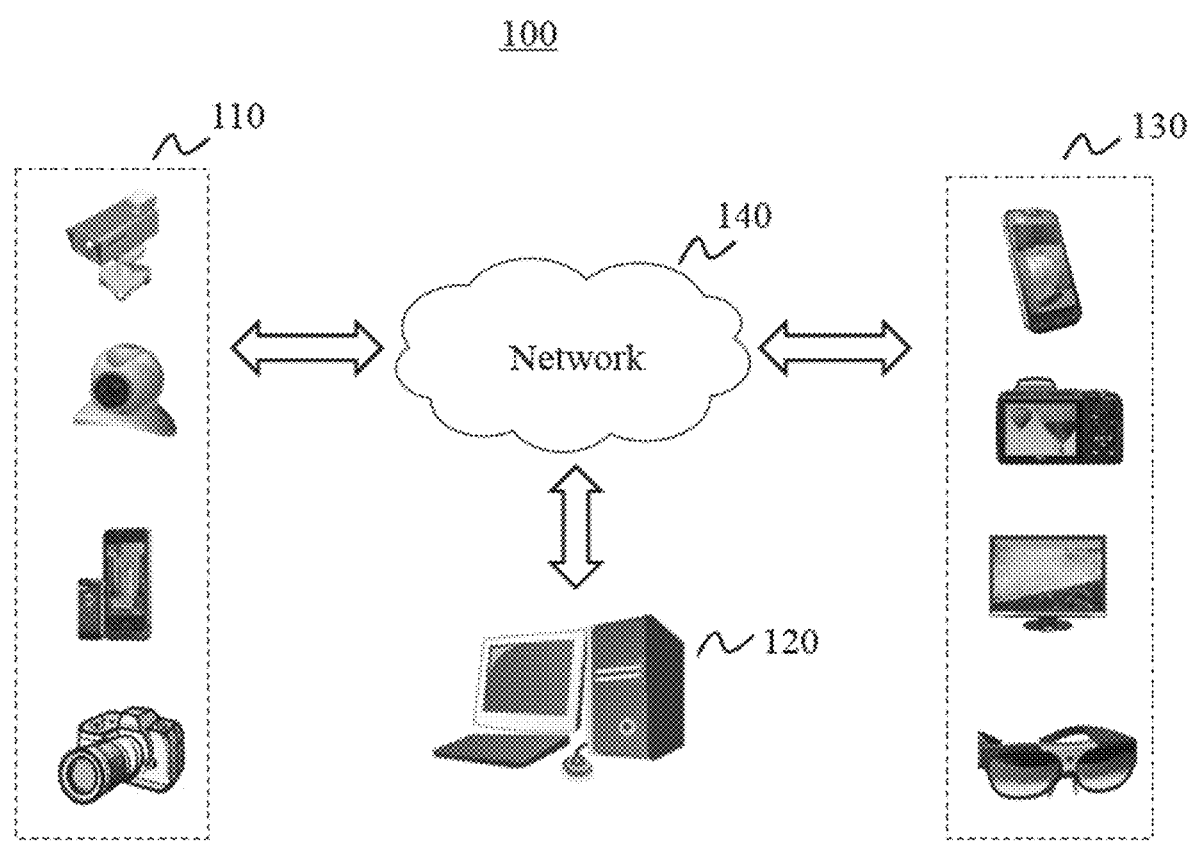
FIG. 1 is a block diagram of an exemplary image fusion system according to some embodiments of the present disclosure.

FIG. 1 is a block diagram of an exemplary image fusion system according to some embodiments of the present disclosure. Image fusion system 100 may be used in various fields including, for example, security technologies, transportation management, prison system, communication industry, energy field, medical treatment, education system, financial service, or the like, or any combination thereof. As illustrated in FIG. 1, exemplary image fusion system 100 may include an imaging device 110, a processing device 120, a display device 130, and a network 140.

Imaging device 110 may be any device configured to capture image data. Merely by way for example, imaging device 110 may include a digital camera, a 2D cameras, a 3D camera, a panoramic camera, a VR camera, a web camera, an instant picture camera, an electronic eye, a camcorder, a thermal imaging device, a visible imaging device, or the like, or any combination thereof. Alternatively or additionally, imaging device 110 may be configured to collect data relating to one or more images from, for example, a smartphone, a tablet PC, a laptop, an optical sensor, a radio detector, an artificial retina, a wearable device (e.g., a 3D glasses, a VR glass, etc.), an eye of a robot, or the like, or any combination thereof. In some embodiments, data captured and/or collected by imaging device 110 may include raw data, processed data, control data, interaction data, image data, video data, analog data, digital data, or the like, or any combination thereof. In some embodiments, data collected by imaging device 110 may include a temperature value, a humidity value, an electromagnetic wave, a force, a number, a character, a text, a video, an image, a voice, an instruction, or the like, or any combination thereof.

In some embodiments, imaging device 110 may capture and/or collect image data based on electromagnet waves with various wavelengths and/or frequencies. In some embodiments, the electromagnet waves may include radio waves, microwaves, infrared radiation, visible light, ultraviolet radiation, X-rays, gamma rays, or the like, or any combination thereof. For example, imaging device 110 (e.g., a thermal imaging device) may capture and/or collect image data of a thermal infrared image based on infrared radiation. As another example, imaging device 110 (e.g., a visible imaging device) may collect image data of a visible image based on visible light.

In some embodiments, imaging device 110 may be configured to capture and/or collect two or more images (e.g., a thermal infrared image and a visible image). Image data of the two or more images may be captured and/or collected by a single imaging device or by two or more different imaging devices. For example, imaging device 110 may be implemented on a camera or part thereof, and configured to capture and/or collect one or more visible images. In some embodiments, imaging device 110 may be configured to capture and/or collect same and/or different types of images with different imaging devices. As another example, imaging device 110 may be implemented on a thermal imaging device and configured to capture and/or collect one or more thermal infrared images. In some embodiments, image data of the two or more images may be collected at the same time or at different time. For example, images in same and/or different types may be captured in turn. In some embodiments, image data of the two or more images may be corresponding to same (or substantially similar) or different field of view (FOV) of one or more objects. In some embodiments, FOV is the extent of an observable world that is collected by imaging device 110 at a position, an orientation, or a point of time.

In some embodiments, imaging device 110 may acquire data from processing device 120, display device 130, or network 140. In some embodiments, image data collected by imaging device 110 may be saved by a memory (not shown) of image device 110, processing device 120, display 130, and/or other component(s) of image fusion system 100 (not shown).

Processing device 120 may be configured to process data from imaging device 110. In some embodiments, processing device 120 may perform operations including, for example, data processing, image registering, parameter setting, image fusion, image adjusting, or the like, or any combination thereof. In some embodiments, processing device 120 may generate a control signal for controlling one or more functions performed by imaging device 110 described herein. For example, processing device 120 may control position, orientation, angle, movement, and/or capturing time of imaging device 110. In some embodiments, the data processed and/or generated by processing device 120 may be transmitted to other component(s) of image fusion system 100, including, for example, imaging device 110, display device 130, and/or network 140. In some embodiments, the data processed and/or generated by processing device 120 may be transmitted to a memory of processing device for storing (not shown). In some embodiments, the data processed and/or generated by processing device 120 may be transmitted to and displayed by display device 130. In some embodiments, the data processed and/or generated by processing device 120 may be transmitted to an external device, for example, a remote terminal (not shown) over network 140.

In some embodiments, processing device 120 may include any processor-based and/or microprocessor-based units. Merely by way of examples, processing device 120 may include a microcontroller, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), or any other circuit or processor capable of executing one or more functions described herein. In some embodiments, processing device 120 may also include a memory (e.g., a random access memory (RAM) or a read only memory (ROM). Processing device 120 may be used in connection with or within the present image fusion system as described herein, and the functions of processing device are not exhaustive and are not limiting. Numerous other changes, substitutions, variations, alterations, and modifications may be ascertained to one skilled in the art. And it is intended that the present disclosure encompass all such changes, substitutions, variations, alterations, and modifications as falling within the scope of the present disclosure.

It should be understood, processing device 120 may be implemented via various methods. In some embodiments, processing device 120 may be implemented by hardware, software, or a combination of hardware and software, by a hardware circuit in a programmable hardware device in a ultra large scale integrated circuit, a gate array chip, a semiconductor such a transistor, or a field programmable gate array, a programmable logic device, and/or by a combination of hardware and software above (e.g., firmware).

Display device 130 may be configured to display information and/or data received from imaging device 110 and/or processing device 120. In some embodiments, the information and/or data displayed on display device 130 may include a value, a text, an image, a user interface, control information, or the like, or any combination thereof. In some embodiments, the images may include original images, fused images, or adjusted fused images, etc. In some embodiments, the fused images and the adjusted fused images may be displayed on display device 130. For example, the fused images and the adjusted fused images may be arranged in a relationship of up and down, image in image, or left and right, etc. In some embodiments, the fused images and the adjusted fused images may be displayed in different windows. In some embodiments, the user interface may be a user interaction interface, a graphical user interface, or a user-defined interface, etc. In some embodiments, the control information may be a fusion parameter, a regulation parameter, or any interaction to control any component in image fusion system. Merely by way for example, the graphical user interface may be configured a user to interact with other components of image fusion system 100 (e.g., imaging device 110 and/or processing device 120). For example, a graphical user interface presented in display device 130 to the user interacting with processing device 120. In some embodiments, display device 130 may include a liquid crystal display (LCD), a light emitting diode (LED) based display, a flat panel display or curved screen, a cathode ray tube (CRT), a 3D display, a plasma display panel, or the like, or any combination thereof.

Network 140 may be configured to facilitate communications between the components of image fusion system 100 (i.e., imaging device 110, processing device 120, and display device 130). For example, network 140 may transmit data from imaging device 110 to processing device 120. And network 140 may also transmit data processed and/or generated by processing device 120 to display device 130. In some embodiments, network 140 may be any type of wired network, wireless network or Ethernet that allows transmitting and receiving data. In some embodiments, network 140 may be a wired network, a nanoscale network, a near field communication (NFC), a body area network (BAN), a personal area network (PAN, e.g., a Bluetooth, a Z-Wave, a Zigbee, a wireless USB), a near-me area network (NAN), a local wireless network, a backbone, a metropolitan area network (MAN), a wide area network (WAN), an internet area network (IAN, or cloud) or the like, or any combination thereof. Or known communication methods which provide a medium for transmitting data between separate are also contemplated. In some embodiments, imaging device 110, processing device 120, display device 130, or network 140 may be connected to or communicate with each other directly or indirectly.

In some embodiments, imaging device 110, processing device 120, display device 130, and network 140 may be integrated together. In some embodiments, function of image fusion system 100 may be implemented by imaging device 110, processing device 120, display device 130, network 140, or any combination thereof.

In some embodiments, one or more components of imaging device 110, processing device 120, and display 130 may located nearly with each other. For example, processing device 120 and display device 130 may be integrated as one device. For another example, imaging device 110 and processing device 120 may be integrated as a single device. In other embodiments, one or more of the above components may be remote from each other. Merely by way for example, processing device 120 may be implemented on a cloud platform (e.g., a cloud computing platform or a cloud storing platform). As another example, display device 130 may be controlled by a remote system (e.g., a remote medical system or a remote security system).

Figure 2:
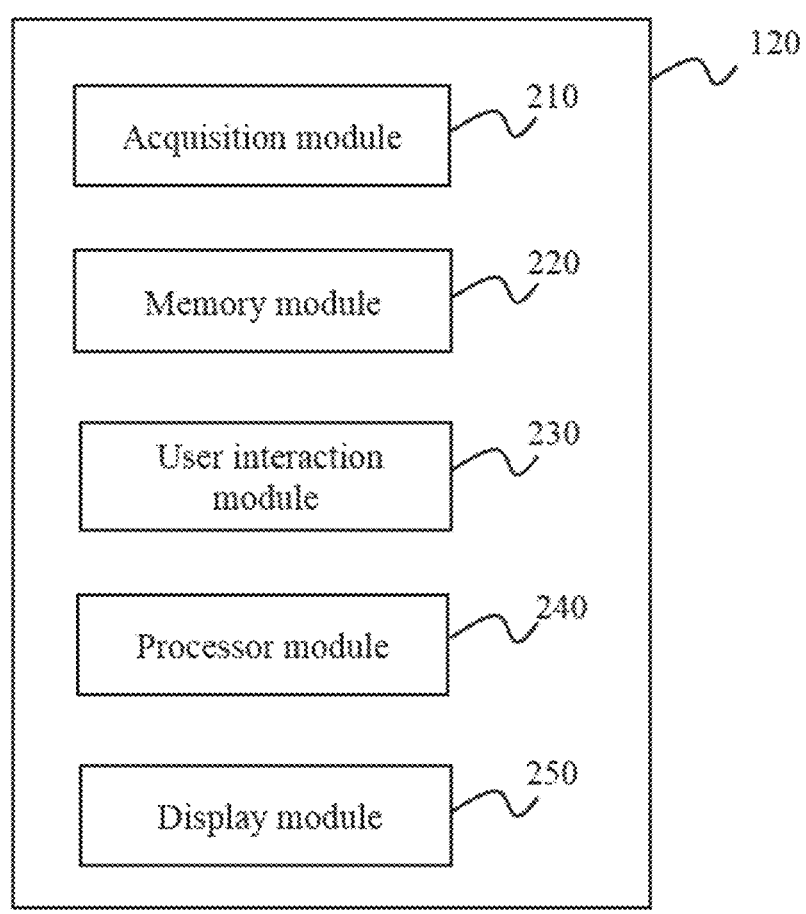
FIG. 2 illustrates a block diagram of an exemplary processing device according to some embodiments of the present disclosure.

FIG. 2 illustrates a block diagram of an exemplary processing device according to some embodiments of the present disclosure. As illustrated in FIG. 2, processing device 120 may include an acquisition module 210, a memory module 220, a user interaction module 230, a processor module 240, and a display module 250.

Generally, the word "module", as used herein, refers to logic embodied in hardware of firmware, or to a collection of software instructions. The modules described herein may be implemented as software and/or hardware modules, and may be stored in any type of non-transitory computer-readable medium or other storage device. In some embodiments, a software module can be compiled and linked into an executable program. It will be appreciated that software modules can be callable from other modules or from themselves, and/or can be invoked in response to detected events or interrupts. Software modules configured for execution on computing devices (e.g., processing device 120) can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. In general, the modules described herein refer to logical modules that can be combined with other modules or divided into sub-modules despite their physical organization or storage.

As another example, acquisition module 210 may be implemented on processing device 120 configured to receive one or more images from imaging device 110 via network 140. For example, acquisition module 210 may be configured to receive one or more visible images captured by a camera or part thereof (i.e., part of imaging device 110). Alternatively or additionally, acquisition module 210 may be configured to receive one or more thermal infrared images captured by a thermal imaging device (i.e., part of imaging device 110). In some embodiments, acquisition module 210 may be further configured to receive one or more images stored in memory module 220. In some embodiments, acquisition module 210 may be also configured to receive one or more fused images based on, for example, a visible image and a thermal infrared image received from imaging devices 110.

Memory module 220 may be configured to store data and/or images received from acquisition module 210. In some embodiments, memory module 220 may be further configured to store data received from a user through user interaction module 230. For example, memory module 220 may be configured to store one or more visible images and/or one or more thermal infrared images. Memory module 220 may further store one or more fusion parameters (preset or defined by the user). In some embodiments, memory module 220 may be configured to store one or more fused images generated by processor module 240. For example, processor module 240 may access the data and/or images stored in memory module 220 and generate a fused image based on a visible image and a thermal infrared image. In some embodiments, memory module 220 may include a device storing data by electricity, magnetism or light. For example, memory module 220 may be a Random Access Memory (RAM), a Read Only Memory (ROM), a hard disk, a magnetic disk, a USB disk, a CD, a DVD, or the like, or any combination thereof.

User interaction module 230 may be configured to receive one or more parameters in response to input by a user. The parameter(s) may be a fusion parameter and/or a regulation parameter. In some embodiments, the fusion parameter may be a value of a factor in a color space. For example, the fusion parameter may be a hue value, a saturation value, or an intensity value, or any combination thereof in an HSI color space. In some embodiments, the regulation parameter may include a color scheme, an image contrast, a region of interest (ROI), or the like, or any combination thereof. In some embodiments, the image contrast may include a partial contrast and/or an entire contrast. The partial contrast may include an image contrast of an ROI in an image. For example, user interaction module 230 may be configured to select an ROI in the fused image. User interaction module 230 may be configured to receive a partial contrast corresponding to the ROI. For another example, the partial contrast may be used to enhance or decrease a contrast level of the selected ROI. In some embodiments, user interaction module 230 may be implemented on a computer, a workstation, a control console, a manipulation platform, an operation desk, or the like, or any combination thereof.

Processor module 240 may be configured to execute one or more instructions and perform one or more functions in accordance with techniques described herein. The instructions may include routines, programs, objects, components, data structures, procedures, modules, and functions, which perform one or more functions described herein. For example, processor module 240 may receive and analyze the visible images and the thermal infrared images captured by imaging device 110. In some embodiments, processor module 240 may further register and fuse the visible images and the thermal infrared images to generate a fused image. Processor module 240 may also adjust the fused image based on the parameter(s) set by the user interaction module 230. Merely by way of example, processor module 240 may adjust the fused image with a black-and-white decoration. Processor module 240 may also identify an ROI by automated recognition based on or input by the user via user interaction module 230.

Display module 250 may be configured to display original image(s) (e.g., the light and/or thermal images), fused image, and/or adjusted fused image. For example, display module 250 may present a fused image generated and/or processed by processor module 240. In some embodiments, display module 250 may display an ROI identified by processor module 240 or by the user via user interaction module 230. In some embodiments, display module 250 may perform one or more functions of display device 130 (illustrated in FIG. 1) described elsewhere in this disclosure.

Figure 3:
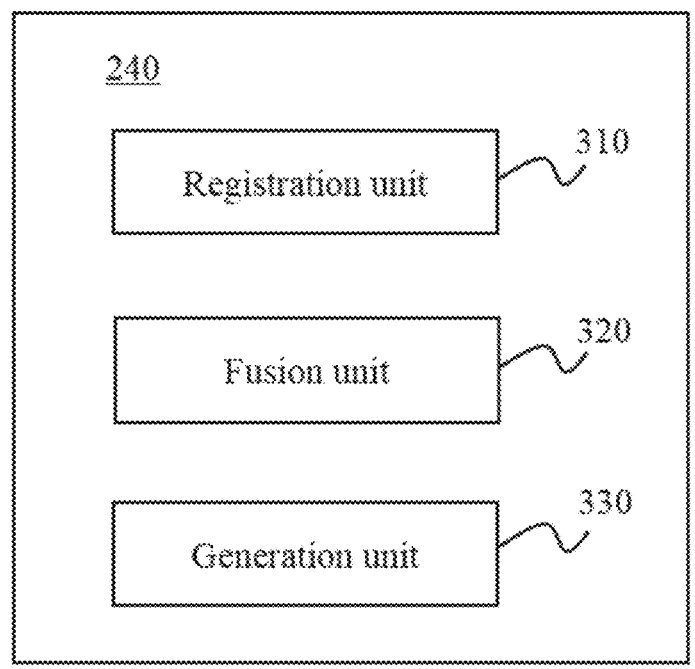
FIG. 3 illustrates a block diagram of an exemplary processing module according to some embodiments of the present disclosure.

FIG. 3 illustrates a block diagram of an exemplary processor module according to some embodiments of the present disclosure. In some embodiments, processor module 240 may include a registration unit 310, a fusion unit 320, and a generation unit 330.

Registration unit 310 may be configured to register two or more images. In some embodiments, image registration may be a process of transforming different image data into one coordinate system. For example, the images may captured by different imaging devices and/or under different settings (e.g., different exposure time, depths, measurements, resolution, or orientation, etc.). Images may be registered to determine an overlapping area of field of view. For example, registration unit 310 may register a thermal infrared image and a visible image and select a same (or substantially same) field of view for image fusion.

Fusion unit 320 may be configured to fuse images. In some embodiments, fusion unit 320 may combine two or more images into a single image to generate a fused image. The fused image may contain information relating to the two or more images. For an example, a fused image based on a thermal infrared image and a visible image may include temperature information, visible light information, or any other information.

In some embodiments, fusion unit 320 may fuse images into a color image. In some embodiments, fusion unit 320 may fuse images in one or more color spaces. The color space may represent human color perception by a three-dimensional space depending on a desired application. In some embodiments, the color space may include but not limited to a red/green/blue (RGB) space, a hue/saturation/luminance (HIS) space, an hue/saturation/lightness (HSL) space, an hue/saturation/value (HSV) space, a commission internationale de l'Eclairage (CIE) space, a hue/saturation/intensity (HSI) space, or any other color space that may present human color perception, or any combination thereof.

In some embodiments, fusion unit 320 may perform an image fusion process. The image fusion process may include high pass filtering technique, principal component analysis (PCA) based image fusion, wavelet transform image fusion, pair-wise spatial frequency matching, or color space based image fusion, etc. Alternatively or additionally, image fusion process may include color-space based image fusion including RGB transform based image fusion, HSI transform based image fusion, HSL transform based image fusion, HSV transform based image fusion, CIE transform based image fusion, HSI transform based image fusion, or the like, or any combination thereof.

Generation unit 330 may be configured to generate an image based on data received from the component(s) of processing device 120 and/or other component(s) of image fusion system 100. In some embodiments, generation unit 330 may generate a fused image. Merely by way for example, the fused image may be generated in a RGB space, an HSL space, an HSV space, an HSI space, or the like. In some embodiments, generation unit 330 may transmit data of the fused image to other component(s) of processing device 120 and/or other component(s) of image fusion system 100 (e.g., display module 250, display device 130, or user interaction module 230, etc.). In some embodiments, the fused image may be generated by generation unit 330 based on data transmitted by fusion unit 320, or other component(s) of processing device 120 and/or other component(s) of image fusion system 100.

In some embodiments, processor module 240 may include a universal processor, for example, a programmed programmable logic device (PLD), a special integrated circuit (ASIC), a microprocessor, a system on chip (SoC), a digital signal processor (DSP), or the like, or any combination thereof. Two or more universal processors of processing module 240 may be integrated into a hardware device, or may be installed in two or more hardware devices. It should be understood, universal processor(s) in processing module 240 may be implemented according to various configurations. For example, in some embodiments, processing procedure of processing module 240 may be implemented by hardware, software, or a combination of hardware software, not only by a hardware circuit in a programmable hardware device in a ultra large scale integrated circuit, a gate array chip, a semiconductor such a transistor, or a field programmable gate array, a programmable logic device, and also by a software performed by various processors, and also by a combination of hardware and software above (e.g., firmware).

Figure 4:
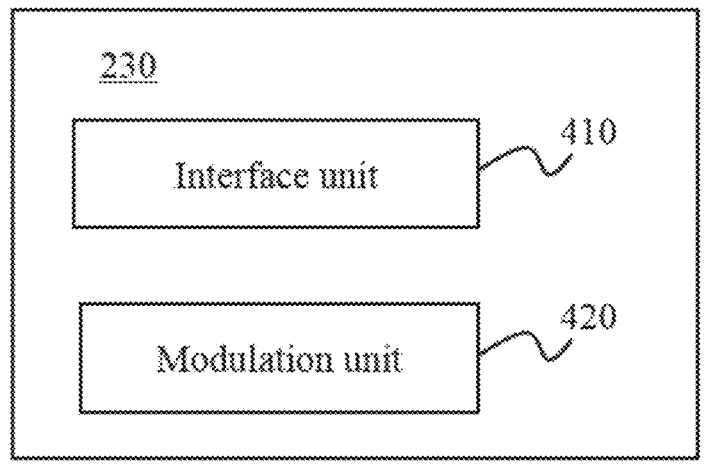
FIG. 4 illustrates a block diagram of an exemplary user interaction module according to some embodiments of the present disclosure.

FIG. 4 illustrates a block diagram of an exemplary user interaction module according to some embodiments of the present disclosure. As illustrated in FIG. 4, exemplary user interaction module 230 may be implemented on processing device 120. In some embodiments, the user interaction module 230 may be configured to perform functions disclosed in this application. The user interaction module 230 may include an interface unit 410 and a modulation unit 420.

Interface unit 410 may be configured to acquire data from a user or other modules (e.g., component(s) processing device 120, display device 130, or network 140, or any combination thereof). In some embodiments, the data acquired may include a regulation parameter including a color scheme, an image contrast, an ROI, or the like, or any combination thereof. In some embodiments, interface unit 410 may include a device configured to receive input from the use (e.g., a touch screen, a key board, a mouse, a camera, a microphone, a scanner, or the like, or any combination thereof).

Modulation unit 420 may be implemented on user interaction module 230 configured to adjust an image. For example, modulation unit 420 may adjust a fused image according to data acquired from interface unit 410. The data may include a regulation parameter including a color scheme, an image contrast, an ROI, or the like, or any combination thereof.

Figure 5:
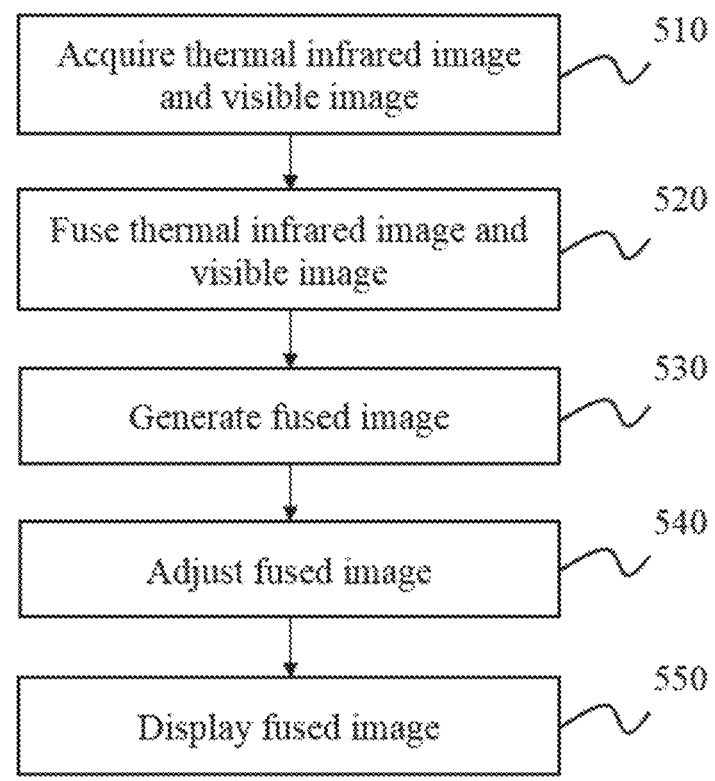
FIG. 5 illustrates a flowchart of an exemplary process for image fusion according to some embodiments of the present disclosure.

FIG. 5 illustrates a flowchart of an exemplary process for image fusion according to some embodiments of the present disclosure. In some embodiments, at 510, acquisition module 210 may acquire data. In some embodiments, data acquired at 510 may include a temperature value, a humidity value, an electromagnetic wave, a force, a number, a character, a text, a video, an image, a voice, an instruction, or the like, or any combination thereof. For example, the image data may include a thermal infrared image and/or a visible image, or any other type of images.

Figure 6:
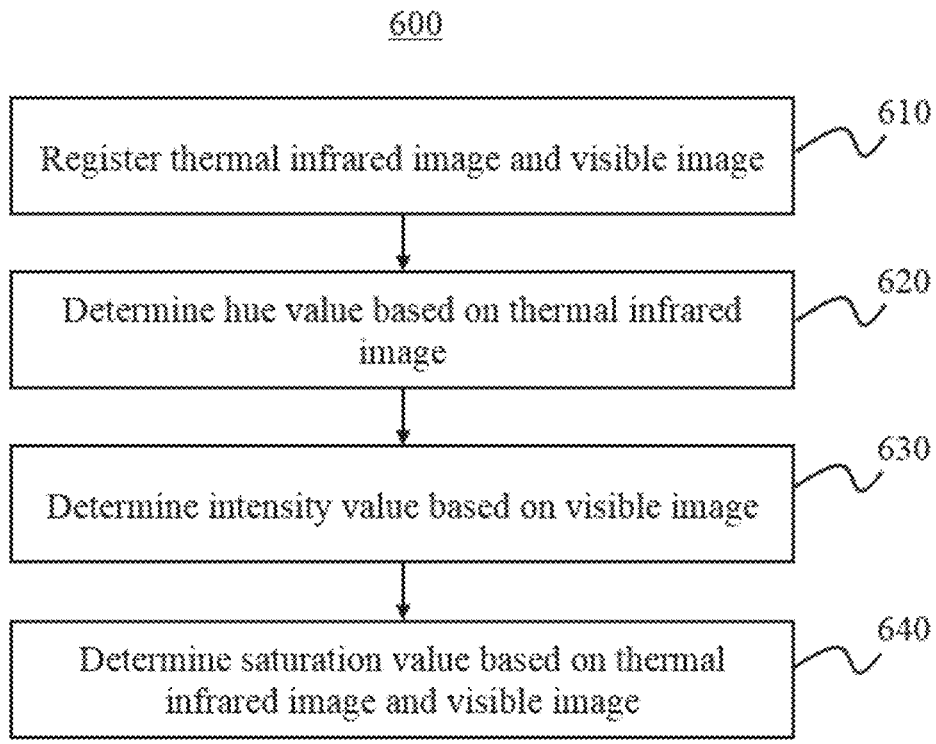
FIG. 6 illustrates a flowchart of an exemplary process for image fusion according to some embodiments of the present disclosure.

At 520, processor module 240 may fuse images. Merely by way for example, the images may include a thermal infrared image and a visible image For illustration purposes, $I_{thermal}$ may denote the thermal infrared image, $I_{visible}$ may represent the visible image, and $I_{fused}$ may represent a fused image. In some embodiments, the images may be fused based on an exemplary process 600 shown in FIG. 6.

At 610, processor module 240 may register the thermal infrared image and the visible image. For example, data of the $I_{thermal}$ and $I_{visible}$ may be registered to determine an overlapping area (or a portion thereof) of field of view. In some embodiments, for a pixel point (u, v), if each measured data of $I_{thermal}$ (u, v) and its corresponding measured data of $I_{visible}$ (u, v) are from the same space spot in a target scene, the data of $I_{thermal}$ (u, v) and $I_{visible}$ (u, v) may be considered to be registered. From 620 to 640, a fusion parameter corresponding to a color space may be determined. For illustration purposes, the HSI color space may be described below, and not intended to limit the scope of the present disclosure. In an HSI color space, the parameter may be a hue value or a hue channel (designated by h), a saturation value (designated by s), and an intensity value (designated by i).

At 620, processor module 240 may determine hue value h based on the thermal infrared image $I_{thermal}$. For example, h of the fused image may be determined based on temperature information from the thermal infrared image $I_{thermal}$. In some embodiments, the corresponding relation between $I_{thermal}$ temperature t and $I_{fused}$ hue value h may be expressed by a function h=$f_h(t)$. For example, the value domain of $f_h(t)$ may be part of color cycle. The function $f_h(t)$ may satisfy conditions including $h_1 \neq h_2 \Rightarrow t_1 \neq t_2$ and $t_1 \neq t_2 \Rightarrow h_1 \neq h_2$ or $$\begin{cases} h_1 = h_2 \\ s_1 \neq s_2 \end{cases}.$$

At 630, processor module 240 may determine intensity value i based on the visible image $I_{visible}$. For example, i of the fused image may be determined based on intensity information from the visible image $I_{visible}$. In some embodiments, the corresponding relation used between $I_{visible}$ intensity $i_{visible}$ ($i_{visible}$ for intensity of visible image) and $I_{fused}$ intensity $i_{fused}$ ($i_{fused}$ for intensity of fused image) may be expressed by a function i=$f_i(i_{visible})$, wherein $f_i(i_{visible})$ may be a monotonous increasing function.

At 640, processor module 240 may determine saturation value s based on the thermal infrared image and the visible image. For example, s of the fused image may be determined based on saturation information from both thermal infrared image and visible image. In some embodiments, the corresponding relation between $I_{thermal}$ temperature t and $I_{fused}$ saturation component $s_1$ may be expressed by a function $s_1=f_{s1}(t)$, wherein $f_{s1}(t)$ may be a user-defined look-up table. In some embodiments, if the look-up table has not been defined, then $s_1=0$. In some embodiments, if $I_{visible}$ is a color image, the corresponding relation between $I_{visible}$ saturation $s_{visible}$ and $I_{fused}$ saturation component $s_2$ may be expressed by a function $s_2=f_{s2}(s_{visible})$, wherein $f_{s2}(s_{visible})$ is a monotonous non-decreasing function. In some embodiments, if $I_{visible}$ is a grayscale image, $s_2$ may be expressed by a constant function. The saturation of the fused image may be expressed by a function s=$s_1+s_2$.

It should be noted that the above description of the process 600 is merely provide for the purpose of illustration, and not intended to limit the scope of the present disclosure. For persons having ordinary skills in the art, various variations and modification may be conducted in the light of the present disclosure. For example, the order of step 620, step 630 and step 640 may be adjusted or they may be performed at the same time. As another example, the process 600 may be performed in other color space, e.g., a CIE space or an RGB space. However, the variations or modifications do not depart from the scope of the present disclosure.

Referring back to FIG. 5, at 530, processor module 240 may generate a fused image. In some embodiments, step 530 may include operations such as pre-processing (such as re-sampling, noise reduction, contrast enhancement, or scale space), feature extraction (such as extraction of lines, edges and ridges, or localization of interest points), segmentation, sorting, or evaluation of a parameter (e.g., a fusion parameter, a regulation parameter, etc.), or the like, or any combination thereof.

At 540, the fused image may be adjusted by processor module 240 (or user interface module 230) In some embodiments, adjustment of fused image at 540 may be controlled by a user or other component(s) of processing device 120 and/or other component(s) of image fusion system 100.

Figure 7:
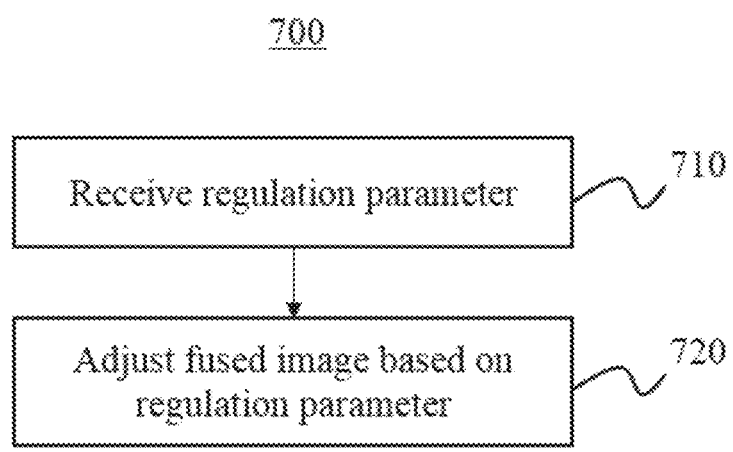
FIG. 7 illustrates a flowchart of an exemplary process for image adjustment according to some embodiments of the present disclosure.
Figure 9:
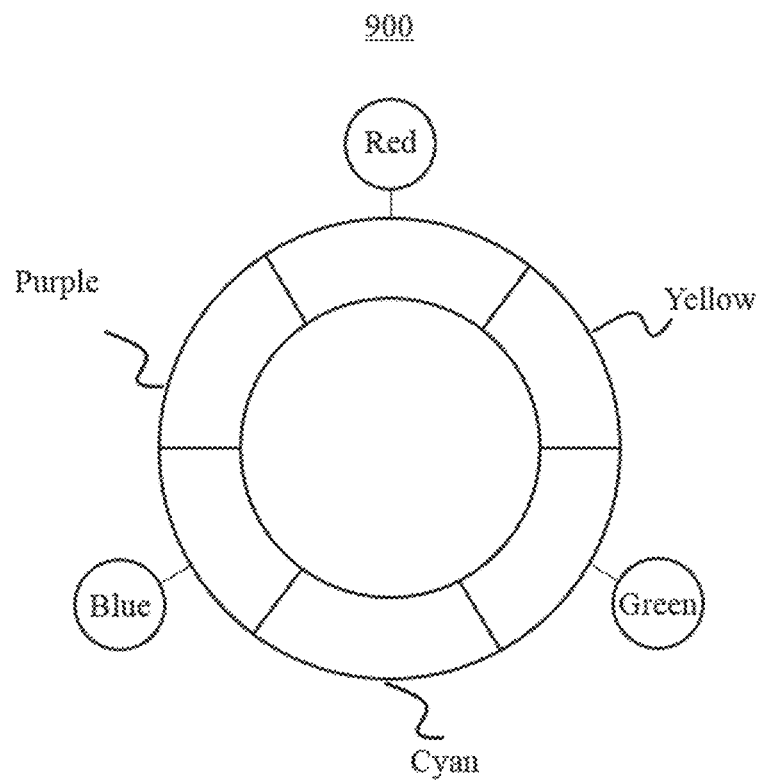
FIG. 9 illustrates an exemplary color circle according to some embodiments of the present disclosure.

In some embodiments, the fused image may be adjusted based on an exemplary process 700 illustrated in FIG. 7. At 710, interface unit 410 may receive a regulation parameter. In some embodiments, the regulation parameter may be self-defined by user or defined by other component(s) of processing device 120 and/or other component(s) of image fusion system 100. In some embodiments, the regulation parameter may include a pre-set or user-adjustable color scheme, an image contrast, an ROI, any or the like, or any combination thereof. In some embodiments, the regulation parameter may be used to define a range of $f_n(t)$ (e.g., a section of a color circle as shown in FIG. 9). For example, the regulation parameter may be $h_1$, $h_2$, or a direction between $h_1$ and $h_2$. Direction between $h_1$ and $h_2$ may be clockwise or counterclockwise. In some embodiments, the regulation parameter received at 710 may be a supplementary color scheme (e.g., a black-and-white decoration). In some embodiments, the regulation parameter may be set based on a user's preference or interest.

At 720, modulation unit 420 may adjust the fused image based on the regulation parameter. In some embodiments, image may be adjusted based on a black-and-white decoration. The black-and-white decoration may include one or more operations. For example, the highest temperature may be defined as white. In some embodiments, this adjustment may be implemented by gradually changing $s_1$ of a color ($h_1$, $s_1$, $i_1$), to 0, and meanwhile adding a half one color block comparing with original color scheme. The lowest temperature may be defined as black. In some embodiments, this adjustment may be implemented by gradually changing $i_2$ of a color ($h_2$, $s_2$, $i_2$) to 0. For a further example, if a range of color based on a first color scheme arrange from yellow (the highest color) to blue (the lowest color) by anticlockwise, range of first color scheme may be represented by upper 180 degrees of color circle, i.e. spanning a length of 3 color blocks. If a range of color based on a second color scheme (e.g., black-white modification of color scheme), yellow may be gradually changed to white by adding an additional length of a half one color block onto yellow color, i.e. gradually changing s to 0; meanwhile, a half of one color block between blueviolet and blue may be gradually changed into black, i.e. gradually changing intensity i to 0.

In some embodiments, at 720, the contrast level of an ROI in a fused image may be adjusted according to the regulation parameter. For example, modulation unit 420 may adjust a contrast level of an ROI according to a partial contrast defined by user.

Referring back to FIG. 5, at 550, display module 250 may display the fused image (generated or adjusted). In some embodiments, the fused image displayed at 730 may present information including temperature and intensity of an image. In some embodiments, the displayed image at 550 may be employed in applications including, e.g., target acquisition, surveillance, night vision, homing, tracking, thermal efficiency analysis, environmental monitoring, industrial facility inspections, remote temperature sensing, short-ranged wireless communication, spectroscopy, weather forecasting, observation of blood flow in the skin, or the like, or any combination thereof.

Figure 8:
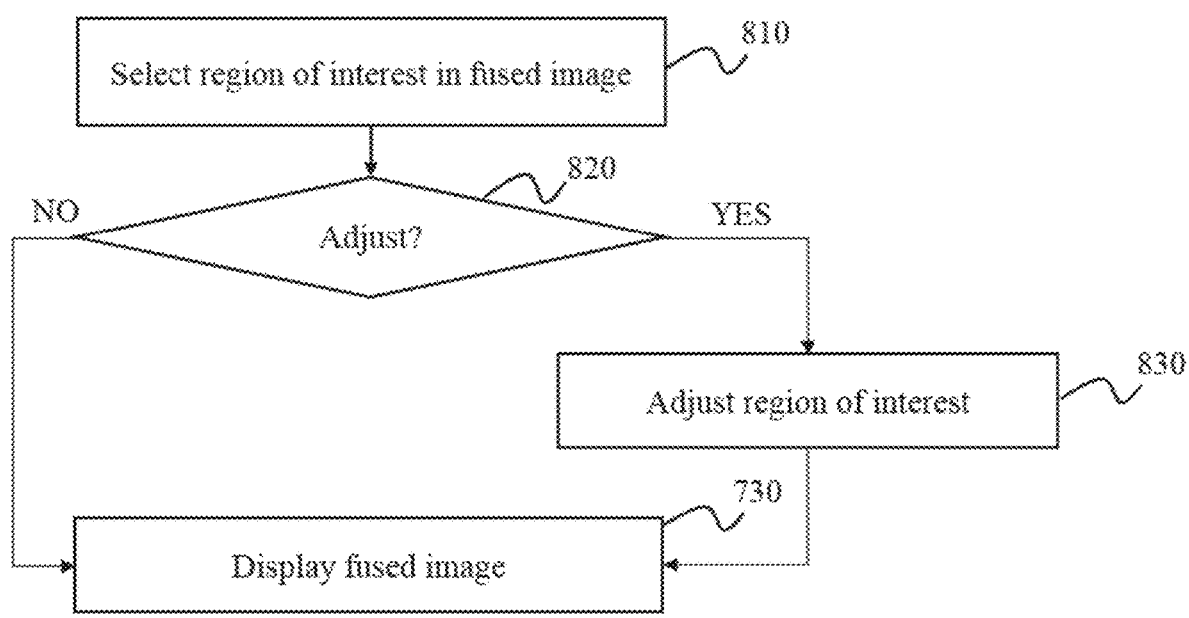
FIG. 8 is a flowchart of an exemplary process for image adjustment according to some embodiments of the present disclosure.

FIG. 8 illustrates a flowchart of an exemplary process for image adjustment according to some embodiments of the present disclosure, which may be used in step 540 shown in FIG. 5 for adjusting images. At 810, processing device 120 may select an ROI in the fused image. In some embodiments, the ROI may be selected according to certain setting methods provided by the user through interface module 230 or by processing device 120. The setting methods may include drawing a box, a circle, an ellipse, or other regular or irregular shape on the fused image by the user. In some embodiments, the ROI in the fused image may be a region containing, for example, a number, a text, a person, an animal, a plant, a building, a vehicle, a road, or the like, or any combination thereof. In some embodiments, the ROI may be selected based on temperature information. One or more regions of interest in the fused image that have a temperature being equal to or exceeding a threshold value (or being equal to or lower than a threshold value) may be selected. The threshold value may be a selected by the user or processing device 120. Additionally or alternatively, the region(s) of interest having a temperature in a temperature range may be selected. The temperature range may be set by the user or processing device 120.

At 820, processing device 120 may determine whether to adjust the region of interest. If processing device 120 determines not to adjust the region of interest, the fused image may be displayed by display module 250. If processing device 120 determines to adjust the region of interest, then at 830, the region of interest may be adjusted by modulation unit 420 based on a color scheme or a partial contrast.

In some embodiments, a contrast level of the region of interest (i.e. contrast level of the ROI) may be adjusted based on the partial contrast. For example, modulation unit 420 (or other suitable units of processing device 120) may determine whether raw data of temperature in the region of interest are available. In some embodiments, the raw data of temperature may be collected and transmitted to processing device by imaging device 110. If the raw data of temperature are not available, the range of a temperature quantized value may be identified, such as $[t_a, t_b]$. The range of a temperature quantized value may be stretched. For example, under a situation of the partial contrast for enhancing the contrast level, the range of a temperature quantized value ($[t_a, t_b]$) may be stretched to [0, 255]. On the other hand, if the raw data of temperature are available, the raw data may be quantized. The value range of temperature, $[t_a, t_b]$, may be [0, 255]. A mapping function of temperature and hue value, f(t), may then be transformed. For example, the mapping function, f(t), may be transformed into $$f\left(\frac{255(t-t_a)}{(t_b-t_a)}\right)$$

after stretching. In some embodiments, if the user defines the partial contrast, a mapping relationship between temperature and hue value may be self-defined by a user. As such, the contrast level of the ROI in the fused image may be adjusted by applying the partial contrast.

At 730, a fused image displayed may include information of temperature and/or intensity of an image. For example, the fused image may be displayed with a higher contrast level in the region of interest. The higher contrast level may enhance accuracy and stability of target acquisition, homing, or tracking, or the like, or thereof.

In some embodiments, information of temperature and intensity of the region of interest in the fused image may be used in security technologies, for example, target detection or target tracking. For example, temperature information may be used without changing an initial modeling algorithm based on color image, including, for example, color histogram, intensity histogram, gradient feature, or the like, or any combination thereof.

FIG. 9 illustrates an exemplary color circle according to some embodiments of the present disclosure. Exemplary color circle 900 may be an abstract illustrative organization of color hues around a circle. In some embodiments, color circle may show relationships between primary colors, secondary colors, or tertiary colors, etc. In some embodiment, color circle may be based on RGB, RGV, HSV, HSI, CIE, or other color space. In some embodiments, the color circle may include color of red, yellow, green, cyan, blue and purple. Red, yellow, green, cyan, blue and purple in color circle may respectively arrange six equal sections from top in clockwise. For example, upper 60 degree section of the color circle illustrated in FIG. 9 may be arranged by red, and upper-right 60 degree section of color circle may be arranged by yellow clockwise.

In some embodiments, the color circle may be shown to the user. In some embodiments, the color circle may be configured to interact with user in image fusion system 100. For an example, the color circle may be displayed in a graphical user interface. In some embodiments, the color circle may be configured to receive regulation parameters by the user. The regulation parameter(s) may include a color scheme. For example, the color circle may be self-defined by a user in different color schemes. In some embodiments, the color scheme may include a mappings between thermal and hue value.

Figure 10:
FIG. 10 illustrates an exemplary initial visible image for image fusion according to some embodiments of the present disclosure.

FIG. 10 illustrates an exemplary initial visible image for image fusion according to some embodiments of the present disclosure. In some embodiments, the visible image may be obtained by a visible light camera. For example, the visible light camera may include card digital camera, manual camera, auto focus camera, telephoto camera, wide field camera, single lens reflex (SLR) camera, digital single lens reflex (DSLR) camera, or the like, or any combination thereof.

Figure 11:
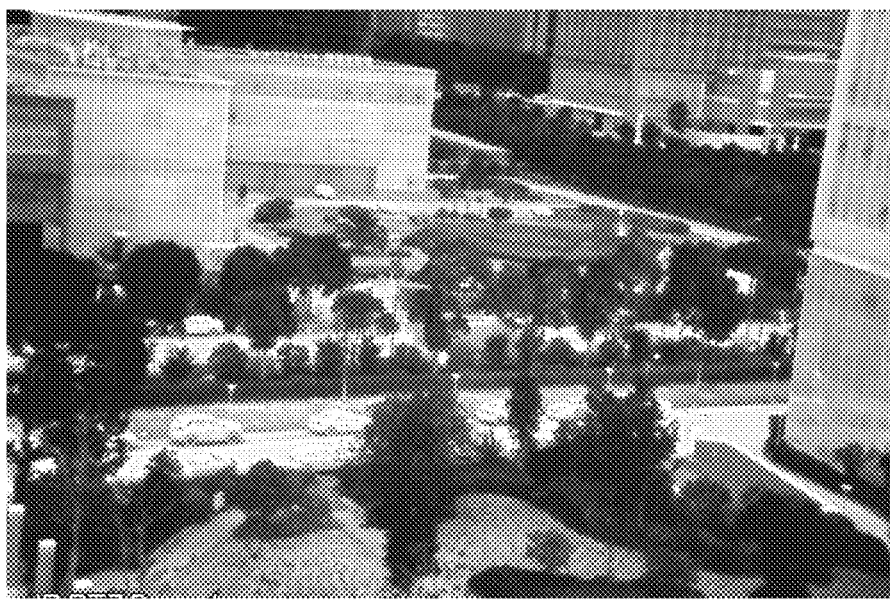
FIG. 11 illustrates an exemplary initial thermal infrared image for image fusion according to some embodiments of the present disclosure.

FIG. 11 illustrates an exemplary initial thermal infrared image for image fusion according to some embodiments of the present disclosure. In some embodiments, initial thermal infrared image may be obtained by a thermal imaging device (part of imaging device 110). For example, the thermal imaging device may utilize infrared detector and optical imaging, wherein infrared detector includes photon detector, thermal detector, cooled infrared detector, uncooled infrared detector, short wave infrared detector, medium wave infrared detector, long wave infrared detector, or the like, or any combination thereof.

Figure 12:
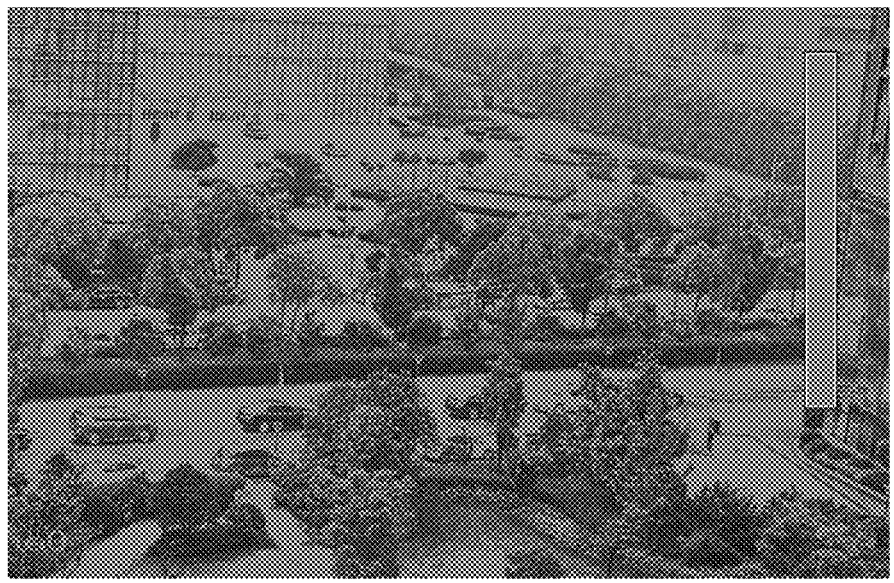
FIG. 12 illustrates an exemplary fused image of visible and thermal infrared images according to some embodiments of the present disclosure.

FIG. 12 illustrates an exemplary fused image of a visible image and a thermal infrared image according to some embodiments of the present disclosure. In some embodiments, temperature t of thermal infrared image $I_{thermal}$ may be quantized a range of 0 to 255. For example, blue (hue value $h_{cold}=240°$) may be selected corresponding to minimum temperature (t=0) and yellow (hue value $h_{hot}=240°$) may be selected corresponding to maximum temperature (t=255) without a black and white decoration, wherein a direction of $h_{hot}$ to $h_{cold}$ may be counter clockwise. In some embodiments, a route of corresponding gradient hue from low to high temperature may be blue-purple-red-yellow and hue value may meet an equation h=h+360°. In some embodiments, a corresponding relation between temperature t and hue h may be expressed by a linear model, as follow:

$$h = f_h(t) = Q\left(h_{cold} + \frac{Q(h_{hot} - h_{cold})}{255} \times t\right), \quad \text{(equation 1)}$$

wherein, function may be determined according to an equation below:

$$Q(h) = \begin{cases} h - 360, & \text{if } h \geq 360° \\ h + 360, & \text{if } h < 0° \end{cases} \quad \text{(equation 2)}$$

wherein the hue value h may be assigned as 0≤h<360°.

In some embodiments, a corresponding relation between intensity of visible image $I_{visible}$ and intensity of fused image $I_{fused}$ may be expressed by a linear model as follow:

$$i=f_i(i_{visible})=a_i+b_i \times i_{visible}, \quad \text{(equation 3)}$$

wherein $a_i$ and $b_i$ may denote model parameters. In some embodiments, in order to ensure i∈[0,255], $a_i$ and $b_i$ may satisfy an equation below:

$$\frac{a_i}{255} + b_i \leq 1, \quad \text{(equation 4)}$$

wherein $a_i \geq 0$, $b_i \geq 0$. In some embodiments, $a_i=0$, $b_i=1$, i.e. i=$i_{visible}$.

In some embodiments, saturation s of the fused image $I_{fused}$ may not be influenced by temperature t of thermal infrared image $I_{thermal}$, i.e., $s_1=0$. Thus, a corresponding relation between saturation component $s_{visible}$ of $I_{visible}$ and saturation s of fused image $I_{fused}$ may be expressed as follows:

$$s=s_2=f_{s2}(s_{visible})=a_{s2}+b_{s2} \times s_{visible}, \quad \text{(equation 5)}$$

wherein $a_{s2}$ and $b_{s2}$ may denote model parameters. In some embodiments, in order to ensure s∈[0,1], $a_i$ and $b_i$ may satisfy an equation below:

$$a_{s2}+b_{s2} \leq 1, \quad \text{(equation 6)}$$

wherein $a_{s2} \geq 0$, $b_{s2} \geq 0$. In some embodiments, $a_{s2}=1$, $b_{s2}=0$, i.e. s=1.

In some embodiments, the fused image of a visible image and a thermal infrared image may be displayed based on above fusion parameters and regulation parameters as shown in FIG. 12.

Figure 13:
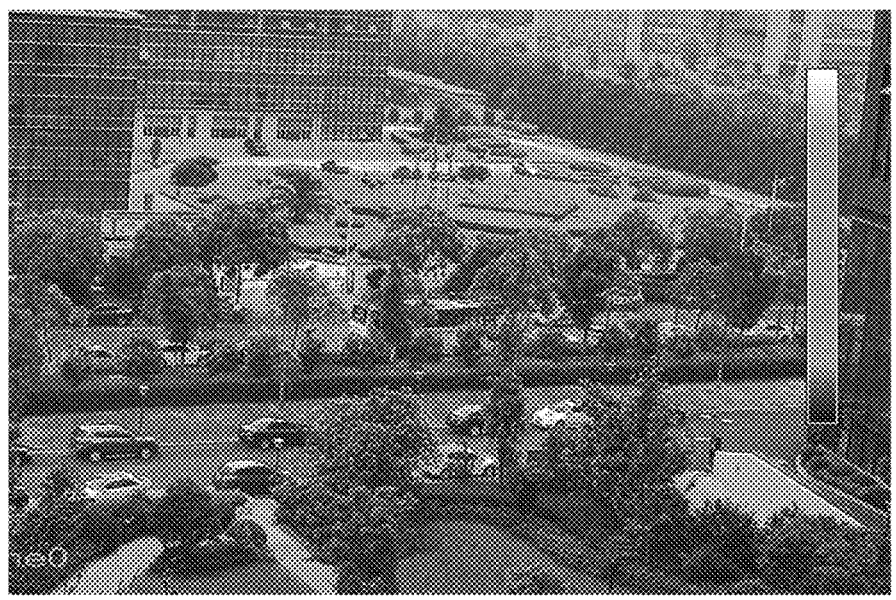
FIG. 13 illustrates an exemplary fused image of visible and thermal infrared images according to some embodiments of the present disclosure.

FIG. 13 illustrates an exemplary fused image of a visible image and a thermal infrared image according to some embodiments of the present disclosure. In some embodiments, temperature t of thermal infrared image $I_{thermal}$ may be quantized a range of 0 to 255. For example, blueviolet (hue value $h_{cold}=270°$) may be selected corresponding to minimum temperature (t=0) and yellow (hue value $h_{hot}=240°$) may be selected corresponding to maximum temperature (t=255) with a black and white decoration, wherein a direction of $h_{hot}$ to $h_{cold}$ may be counter clockwise. Merely by way for example, a route of corresponding gradient hue from low to high temperature may be blueviolet-purple-red-yellow and hue value may meet an equation h=h+360°. In some embodiments, a corresponding relation between saturation component $s_{visible}$ of $I_{visible}$ and saturation of the fused image $I_{fused}$ may be expressed by linear model below:

$$s=s_2=f_{s2}(s_{visible})=a_{s2}+b_{s2} \times s_{visible}, \quad \text{(equation 7)}$$

wherein $a_{s2}=0.3$, $b_{s2}=0.7$, i.e. s=0.3+0.7×$s_{visible}$.

In some embodiments, the fused image may be displayed based on above fusion parameters and regulation parameters as shown in FIG. 13.

Figure 14:
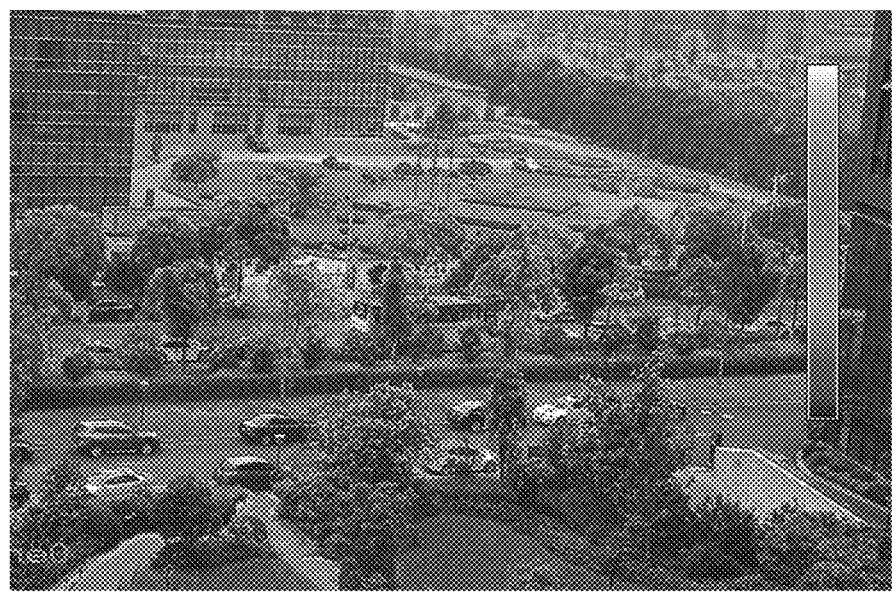
FIG. 14 illustrates an exemplary fused image of visible and thermal infrared images according to some embodiments of the present disclosure.

FIG. 14 illustrates an exemplary fused image of a visible image and a thermal infrared image according to some embodiments of the present disclosure. In some embodiments, hue value and saturation value of fused image $I_{fused}$ may be defined by a temperature look-up table. The temperature look-up table may be defined by a user according to a color circle or any suitable rules. For example, a route of corresponding gradient hue from high to low temperature may be white-yellow-red-purple-black. As another example, a route of corresponding gradient hue from high to low temperature may be randomly determined. In some embodiments, a reference bar of temperature-hue on right side of fused image may be used. In some embodiments, the fused image may be displayed based on the user-defined look-up table as shown in FIG. 14.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module" or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

What is claimed is:

1. A method comprising:
obtaining a thermal infrared image and a visible image;
receiving a fusion parameter corresponding to a color space;
generating, based on the fusion parameter, a fused image of the thermal infrared image and the visible image;
receiving a regulation parameter, the regulation parameter including a color scheme and a partial contrast; and
adjusting the fused image according to the regulation parameter, including adjusting a contrast level of a region of interest (ROI) in the fused image based on the partial contrast, wherein the adjusting a contrast level of a region of interest (ROI) includes:
identifying a range of a temperature quantized value of the ROI;
stretching the range of the temperature quantized value;
determining a mapping function of hue value and temperature quantized value based on the identified range of the temperature quantized value and the stretched range of the temperature quantized value; and
transforming temperature quantized values of the ROI to hue values based on the mapping relationship.

2. The method of claim 1, wherein the color space comprises an HSI space, a CIE space, or an RGB space.

3. The method of claim 1, wherein:
the color space is an HSI space, and
the fusion parameter corresponding to the color space includes a hue value, a saturation value, and an intensity value.

4. The method of claim 3, wherein the hue value is determined according to the thermal infrared image.

5. The method of claim 3, wherein the saturation value is determined according to the thermal infrared image and the visible image.

6. The method of claim 3, wherein the intensity value is determined based on the visible image.

7. The method of claim 1, wherein the color scheme includes a black-and-white decoration.

8. The method of claim 1, wherein:
the adjusting the fused image according to the regulation parameter includes adjusting a color display of the fused image according to the color scheme.

9. The method of claim 1, the adjusting a contrast level of a region of interest (ROI) in the fused image based on the partial contrast further includes:
selecting a region of interest (ROI) in the fused image;
magnifying the ROI; and
adjusting a contrast level of the ROI.

10. The method of claim 1, further comprising detecting or tracking an object according to the fused image.

11. A system comprising:
an imaging device configured to acquire a thermal infrared image and a visible image;
one or more processors that are configured to execute instructions to:
receive a fusion parameter corresponding to a color space;
generate, based on the fusion parameter, a fused image of the thermal infrared image and the visible image;
receive a regulation parameter, the regulation parameter including a color scheme and a partial contrast; and
adjust the fused image according to the regulation parameter, wherein to adjust the fused image according to the regulation parameter, the one or more processors are further configured to adjust a contrast level of a region of interest (ROI) in the fused image based on the partial contrast, wherein to adjust a contrast level of a region of interest (ROI), the one or more processors are further configured to
identify a range of a temperature quantized value of the ROI;
stretch the range of the temperature quantized value;
determine a mapping function of hue value and temperature quantized value based on the identified range of the temperature quantized value and the stretched range of the temperature quantized value; and
transform the temperature quantized values of the ROI to hue values based on the mapping relationship.

12. The system of claim 11, wherein the color space comprises an HSI space, a CIE space, or an RGB space.

13. The system of claim 11, wherein:
the color space is an HSI space, and
the fusion parameter corresponding to the color space includes a hue value, a saturation value, and an intensity value.

14. The system of claim 13, wherein the hue value is determined according to the thermal infrared image.

15. The system of claim 13, wherein the saturation value is determined according to the thermal infrared image and the visible image.

16. The system of claim 13, wherein the intensity value is determined based on the visible image.

17. The system of claim 11, wherein the color scheme includes a black-and-white decoration.

18. The system of claim 11, wherein:
to adjust the fused image according to the regulation parameter, the one or more processors are further configured to adjust a color display of the fused image according to the color scheme.

19. The system of claim 11, wherein to adjust the fused image according to the regulation parameter, the one or more processors are further configured to:
select a region of interest (ROI) in the fused image;
magnify the ROI; and
adjust a contrast level of the ROI.

20. A non-transitory computer readable medium embodying a computer program product, the computer program product comprising instructions configured to cause a processor to perform a method comprising:
acquiring a thermal infrared image and a visible image;
receiving a fusion parameter corresponding to a color space;
generating, based on the fusion parameter, a fused image of the thermal infrared image and the visible image;
receiving a regulation parameter, the regulation parameter including a color scheme and a partial contrast; and
adjusting the fused image according to the regulation parameter, including adjusting a contrast level of a region of interest (ROI) in the fused image based on the partial contrast, wherein the adjusting a contrast level of a region of interest (ROI) includes:
identifying a range of a temperature quantized value of the ROI;
stretching the range of the temperature quantized value;
determining a mapping function of hue value and temperature quantized value based on the identified range of the temperature quantized value and the stretched range of the temperature quantized value; and
transforming temperature quantized values of the ROI to hue values based on the mapping relationship.

* * * * *